United States Patent [19]
Abbad et al.

[11] Patent Number: 5,797,423
[45] Date of Patent: Aug. 25, 1998

[54] DEVICE FOR CUTTING OFF A FLOW IN A CONDUIT FOR FLUIDE

[76] Inventors: Marcelo Hombravella Abbad, Emancipacio, 26-4th floor, 2a door, 08022 Barcelona, Spain; Daniel Guillo Vive, Roger de Lluria 128, 08037 Barcelona, Spain

[21] Appl. No.: 534,462

[22] Filed: Sep. 27, 1995

[30] Foreign Application Priority Data

Sep. 27, 1994 [ES] Spain ................... 9402028

[51] Int. Cl.$^6$ .......................... F16K 43/00; F16K 3/06
[52] U.S. Cl. .................. 137/315; 138/94.5; 251/301; 251/302; 285/197; 285/199
[58] Field of Search ..................... 137/315, 318; 138/94.3, 34.5; 251/301, 302, 299, 300; 285/197, 198, 199

[56] References Cited

U.S. PATENT DOCUMENTS

| | | | |
|---|---|---|---|
| 511,327 | 12/1893 | Eley | 285/197 |
| 1,164,033 | 12/1915 | Thomason | 138/94.5 |
| 1,214,645 | 2/1917 | Boyden | 251/302 |
| 1,613,138 | 1/1927 | Seymour et al. | 138/94.5 |
| 1,656,280 | 1/1928 | Lalor | 251/302 |
| 2,225,153 | 12/1940 | Brown | 138/94.3 |
| 2,271,138 | 1/1942 | Hamer | 138/34.3 |
| 2,386,893 | 10/1945 | Hamer | 138/94.3 |
| 2,800,926 | 7/1957 | Handley | 138/94.5 |
| 2,805,836 | 9/1957 | Taylor | 251/301 |
| 2,997,316 | 8/1961 | Recht | 285/197 |
| 3,045,706 | 7/1962 | Dillon | 251/301 |
| 3,047,006 | 7/1962 | Transeau | 251/301 |
| 3,203,664 | 8/1965 | Ver Nooy | 251/302 |
| 3,762,743 | 10/1973 | Hawle | 285/197 |
| 5,052,431 | 10/1991 | Jiles | 137/318 |

*Primary Examiner*—George L. Walton
*Attorney, Agent, or Firm*—Dennison, Meserole, Pollak & Scheiner

[57] ABSTRACT

A device for cutting off the flow in a conduit for fluids, consisting of a sluice (2), transversely arranged in a conventional conduit for fluids (1) between two flanges (3), one or two flanges (3) being fitted with a tab (6), a hole and axle (7) around which the sluice (2) turns according to a circular motion establishing fluid cut off or flow positions. In an alternative embodiment of the invention for performing connections under pressure, a mounting is provided on the conduit, constituted of a tubular assembly consisting of a reel (9) and a seat (10), which is fastened to the conduit by means of straps (11), a sluice (15) is inserted between the tubular assembly and the reel.

3 Claims, 5 Drawing Sheets

DEVICE FOR CUTTING OFF A FLOW IN A CONDUIT FOR FLUIDE

BACKGROUND OF THE INVENTION

The present invention relates to a device for cutting of the flow in a conduit for fluids.

More specifically, this invention provides means for making it easy to cut off the flow in a conduit or pipeline. The invention has application to connections added to conduits under pressure.

RELATED ART

At the present state of the art, it is pointed out that in order to cut off a flow in conduits for fluids, several models of stopcocks are used, which include excessively sophisticated installations exhibiting a poor performance, with substantial load losses.

SUMMARY OF THE INVENTION

The device for cutting off a flow in a conduit for fluids of the invention solves these drawbacks, because its simple construction and easy and quick assembly, while its performance is very reliable.

Essentially, the invention consist of a sluice capable of being inserted into a conduit for fluids in order to cut off the flow passing through it. The sluice is inserted into the conduit between two flanges, and for this purpose at least one or both flanges are fitted with a sealing gasket.

The insertion of the sluice can be performed by removing only two of the screws joining the flanges, and loosening the remaining ones.

The flanges are to be separated enough for the sluice to pass between them, but without causing leaks.

In order to obtain an adequate separation between the flanges when inserting the sluice, several methods can be employed, for example by using distance screws threaded into one of the flanges, pins in the ends of the screws joining the flanges in order to limit the loosening of the nuts, and fasteners fitted with tabs to be coupled to the edges of the flanges when manipulating the sluice to obtain a correct position between both flanges, for example.

To expedite the flow cutting off operation, one or both flanges can be fitted with a drilled tab around the axle of which the sluice can rotate according to a circular motion. The tab can be fixed or inserted; for example, it can be threaded into an edge of the flange.

According to another embodiment, the invention can be advantageously applied to carry out additional connections to a conduit under pressure of water, gas or other fluids.

An assembly composed of two tubular bodies between which the sluice can be inserted is installed on the piping or conduit.

A first of these bodies is reel shaped, while the second body presents a circular shape coincidental with the first, thus constituting a base or seat which is fastened to the conduit by means of straps.

The straps are joined to the seat by means of screws resting on ball-and-sockets in order to obtain the correct positioning with regard to the diameter of the conduit on which they are mounted.

The seat has a flange face including an upper gasket, and a lower gasket fitting tightly over the conduit.

The upper gasket, which can be, for example, an O-ring, comes into contact with the lower flange of the reel, and maintains a tight seal upon inserting the sluice, while the lower gasket projects so that it can be installed on different sizes of conduit.

Once this assembly has been installed on the piping or conduit, a hole is drilled in the conduit. To this end, a suitable tool can be mounted on the upper flange of the reel.

After the hole is cut or drilled, the tool is raised or removed, in order to allow the sluice to be inserted into the piping.

The screws joining both the seat and the reel are loosened, the correct distance between the flanges being maintained by any of the above-mentioned distance means, while two screws impeding the sluice to be inserted are removed.

Next, the sluice is inserted. A hole in the tab and an axle permit turning of the sluice. The drilling machine is removed.

Further components of a conduit can be installed on the upper flange of the reel.

After the components are installed with the sluice in the closed position, the sluice can be removed, the two removed screws can be returned and all the flange screws can be tightened, completing the connection.

In order to complement the following description and aid to a better understanding of the features of the invention, the accompanying drawings show, in an illustrative but non limitative way, the most relevant details of the invention.

DETAILED DESCRIPTION OF THE INVENTION

Figure 1:
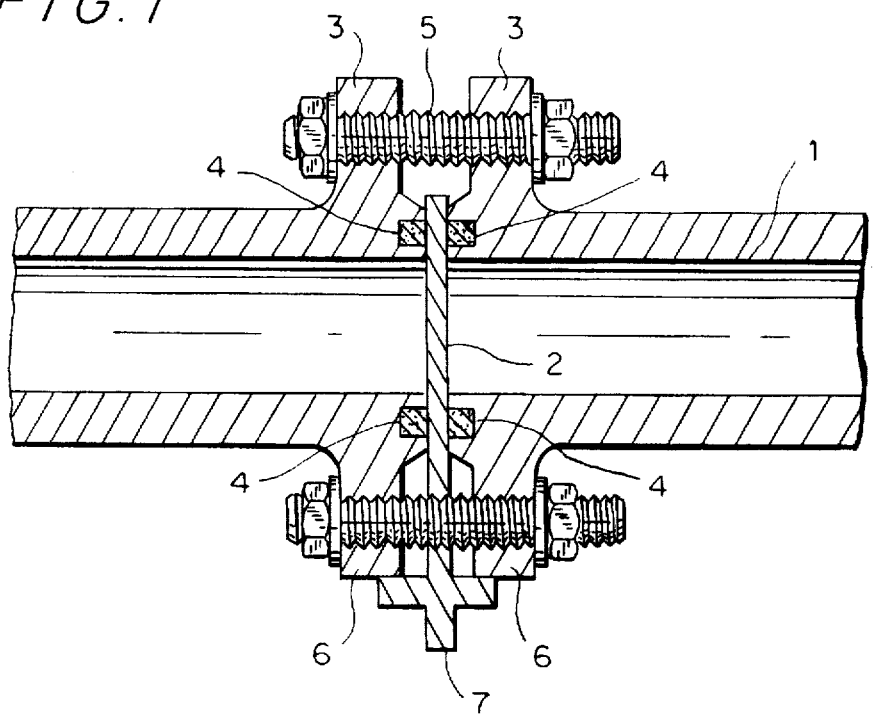
FIG. 1 is a longitudinal sectional view of a flow cut off device between two conduit sections according to the invention.
Figure 2:
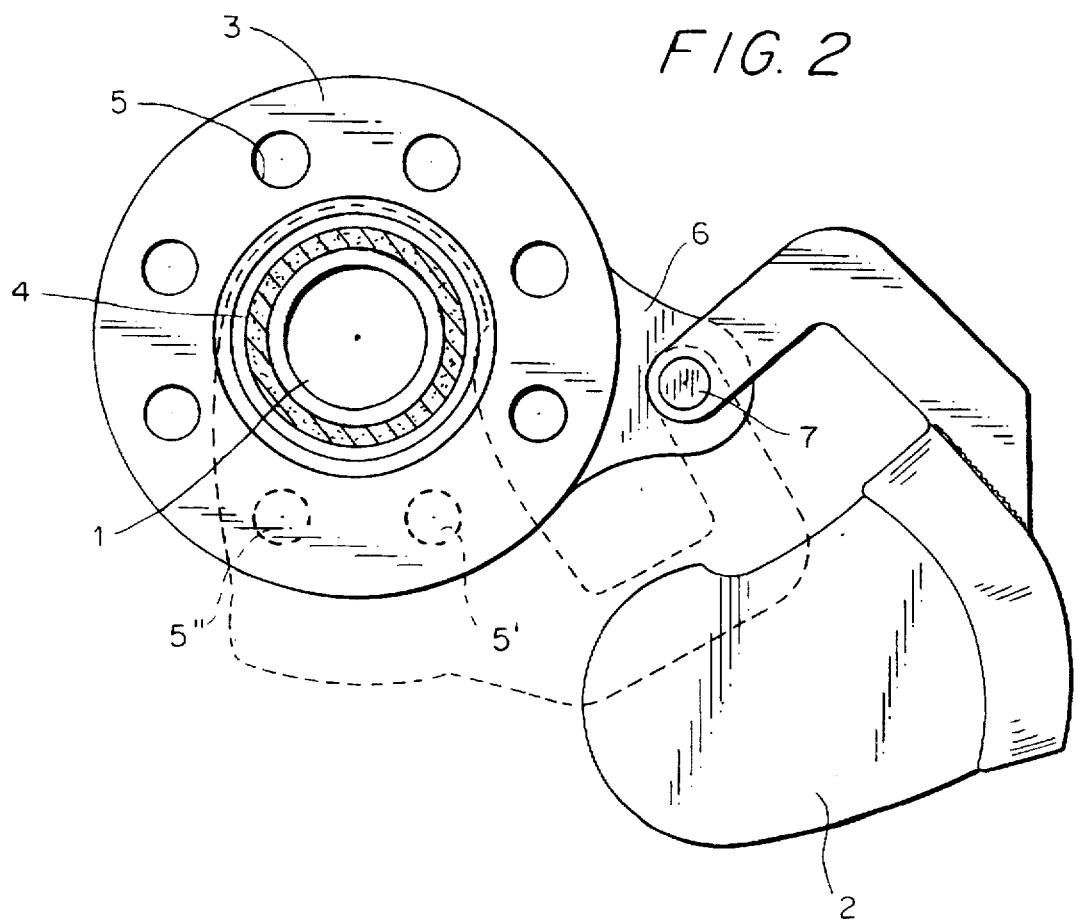
FIG. 2 is a cross sectional view of a conduit with the sluice open.
Figure 3:
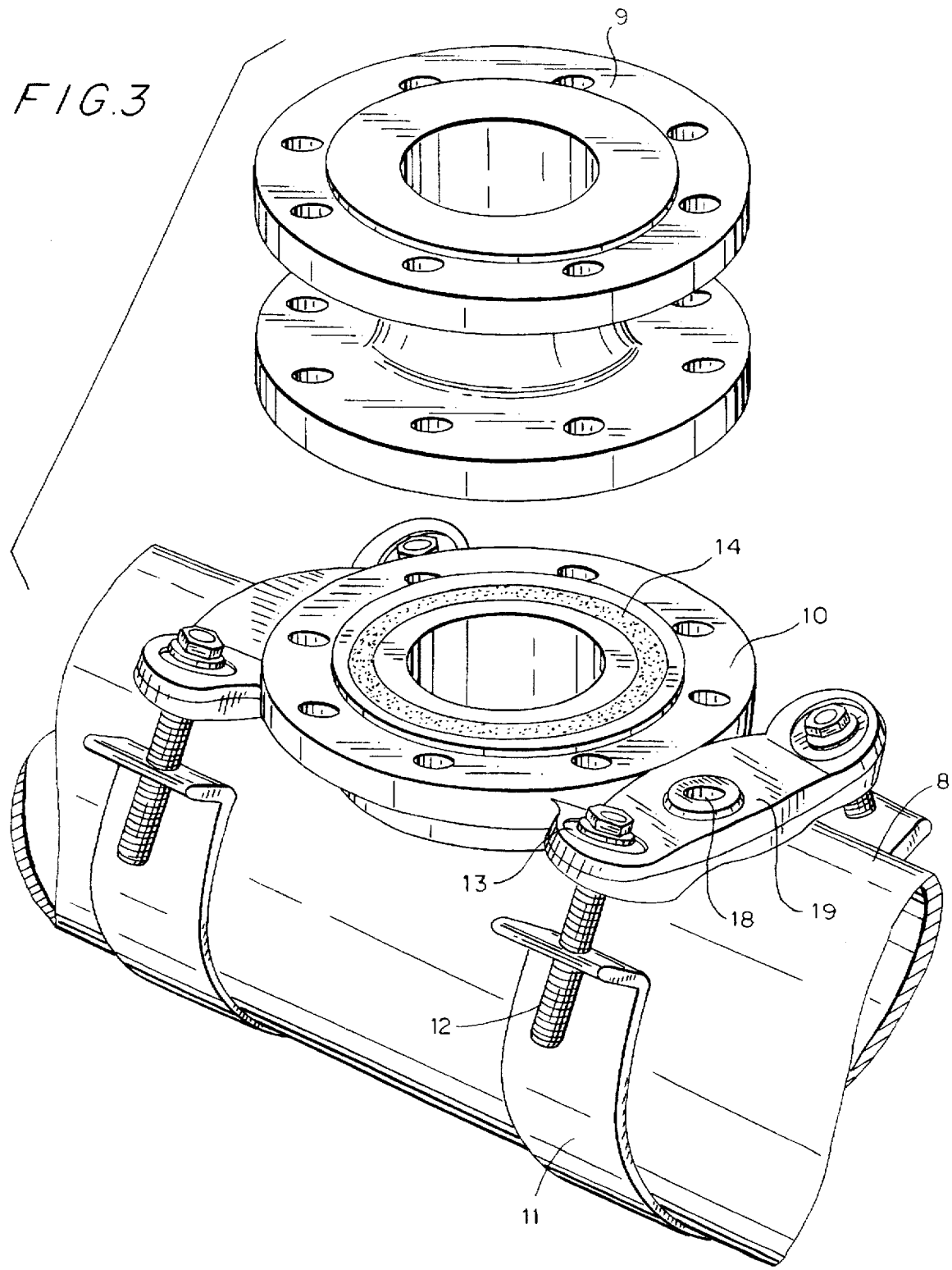
FIG. 3 is a perspective view of an alternate embodiment of the invention.
Figure 4:
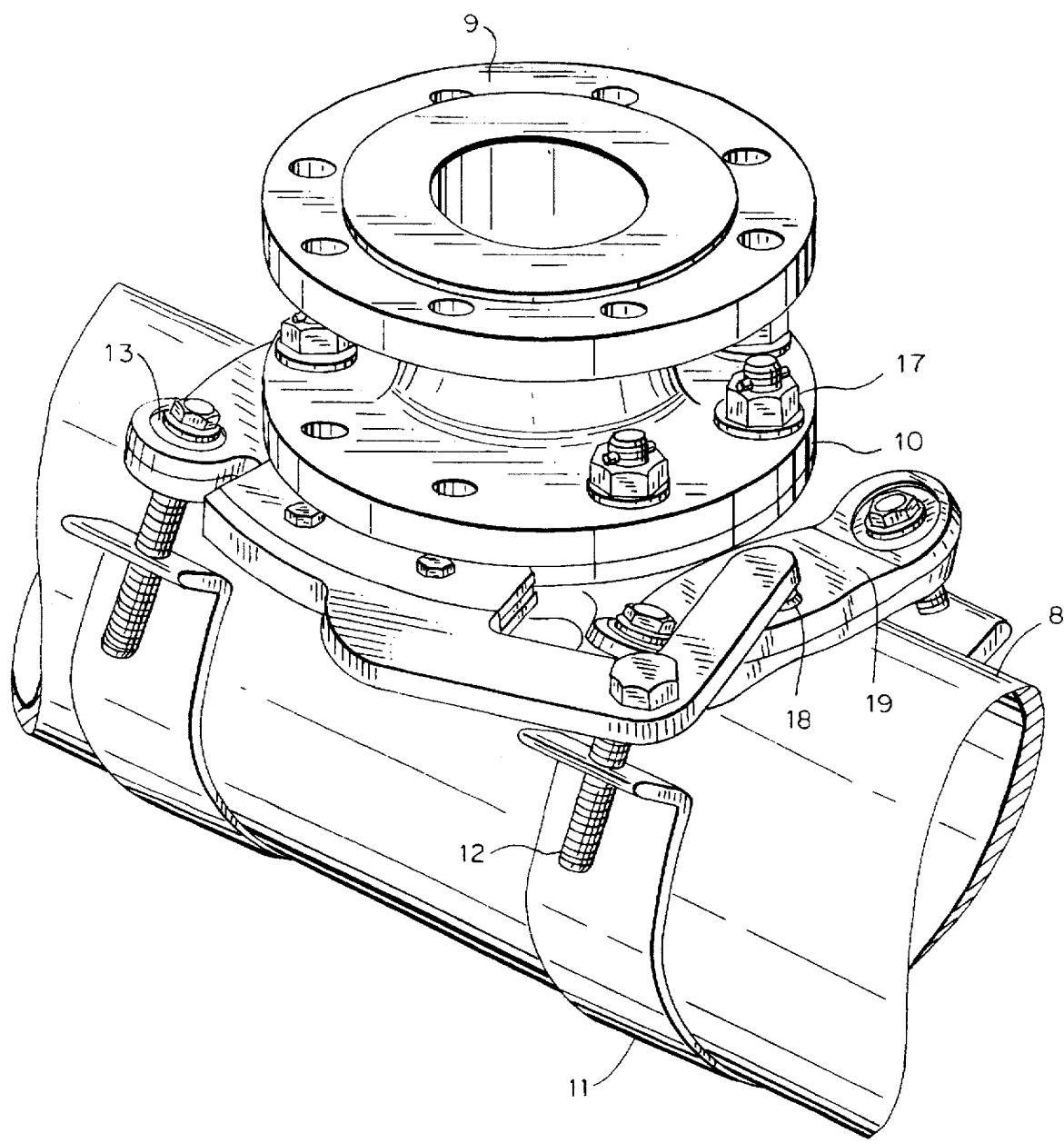
FIG. 4 is a view similar to FIG. 3, where the sluice is represented in flow cut off position.
Figure 5:
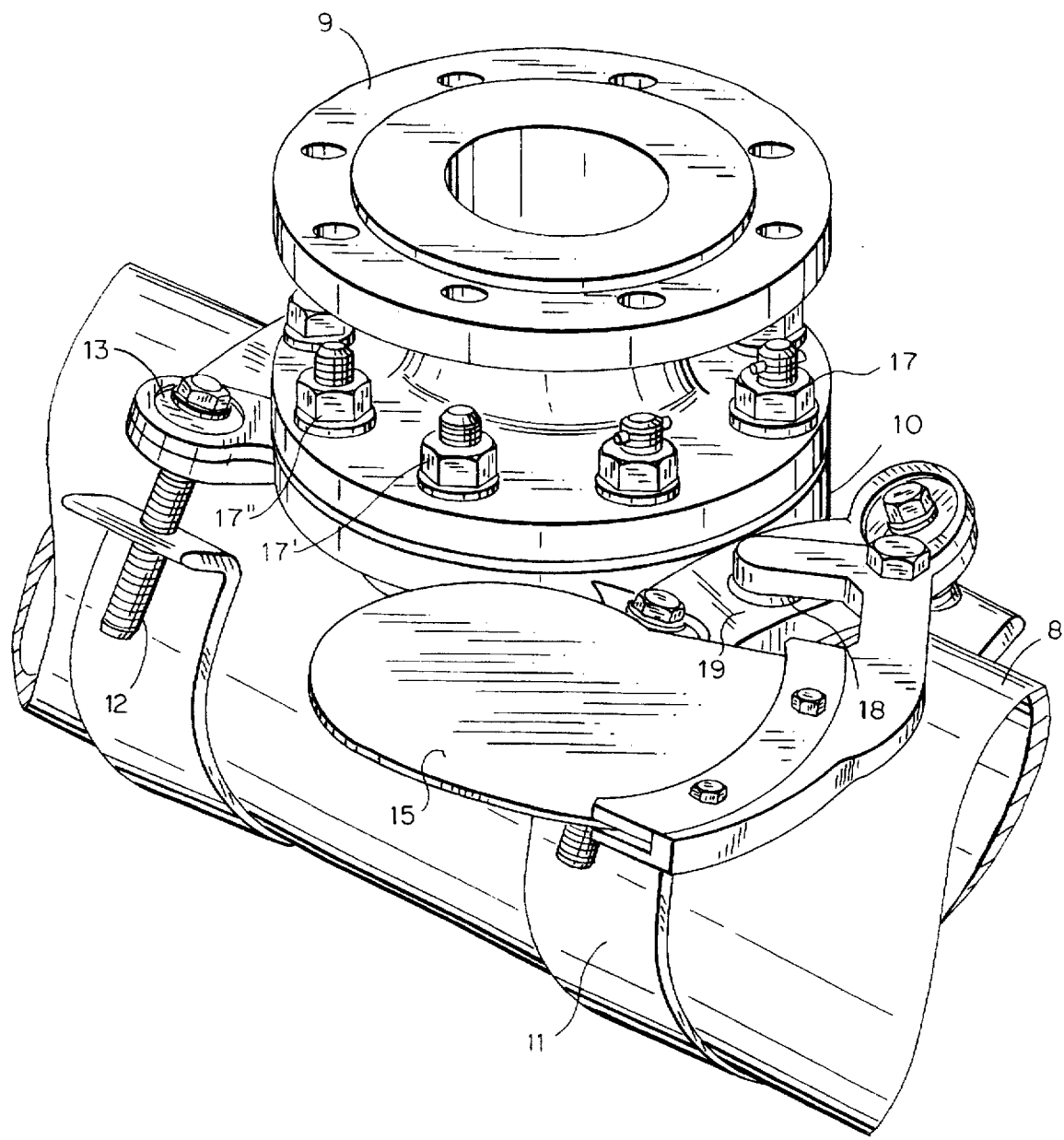
FIG. 5 is a view similar to FIG. 4, with the sluice in an open position.
Figure 6:
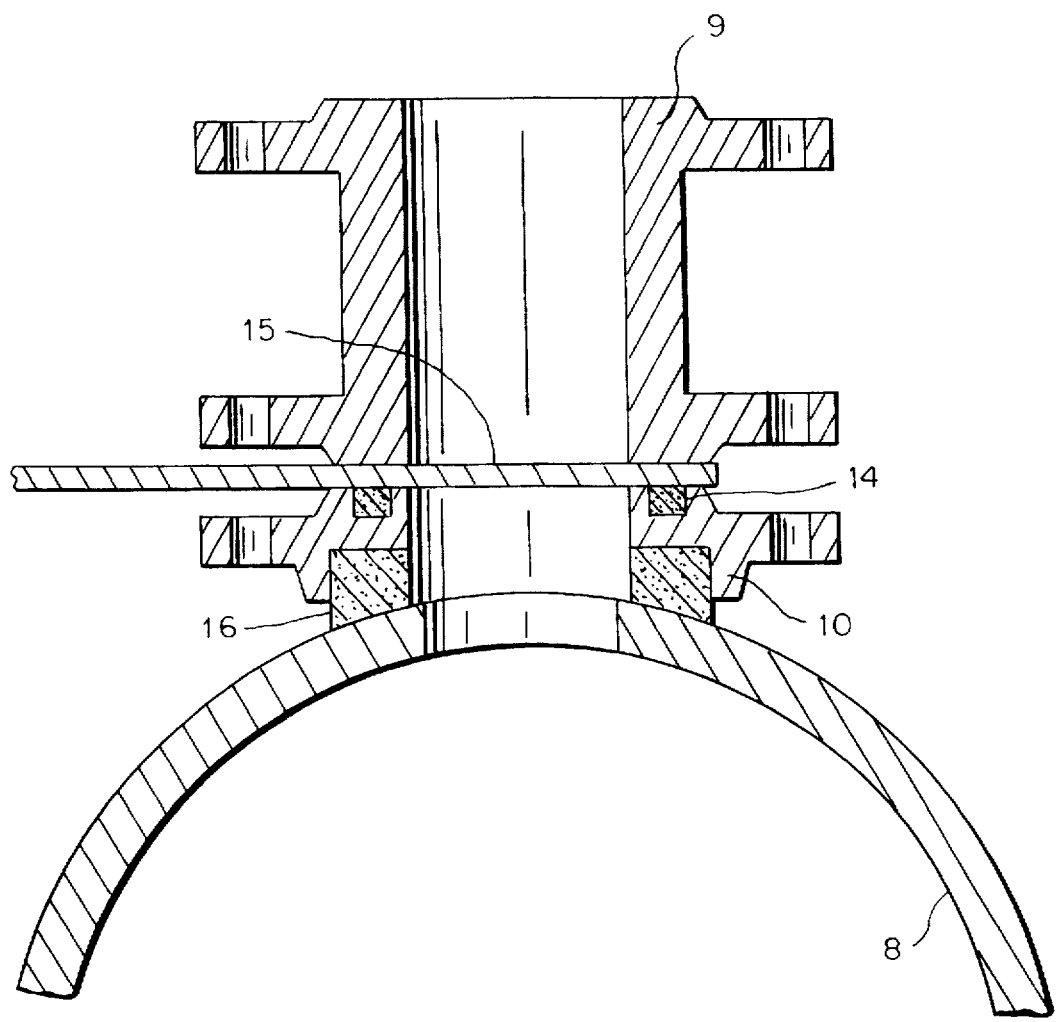
FIG. 6 is a cross sectional view of the alternate embodiment.

The embodiment according to FIGS. 1 and 2, shows a conduit for fluids 1 wherein a passing fluid can be cut off by a sluice 2 arranged between flanges 3. One or both flanges are fitted with a gasket 4. The flanges are held together with fasteners such as screws 5, 5', 5".

The insertion of the sluice 2 into a conduit is performed by removing two screws 5', 5", and slackening the remaining screws 5.

The flanges 3 are to be separated enough, without causing leaks for the sluice 2 to pass between them.

An adequate separation between flanges 3 for inserting the sluice 2 is obtained by several separating tools, such as screws, pins and so on.

As shown in FIG. 2, flanges 3 include a tab 6 with an opening for the axle 7 around which the sluice can turn, according to a circular motion, making it easy to perform the flow cutting off operation.

FIGS. 3 through 6 show an alternate embodiment of the invention, which consists of an application where an additional conduit is connected under pressure.

These Figures, show a conduit 8 on which a tubular assembly as mounted, the tubular assembly being composed of a reel 9 and a seat 10 which is fastened to the conduit 8 by means of straps 11. The straps are bonded to seat 10 by means tab or of brackets 19 and screws 12 resting on ball-and-sockets 13, for allowing a correct orientation to be obtained, according to the diameter of the conduit on which they are installed.

Seat 10 includes an upper gasket 14 which provides a seal with the flange arranged on the lower face of the reel 9, for maintaining a tightness when the sluice 15 is inserted. A lower gasket 16 (FIG. 6) is designed to fit several sizes of conduits, and operates to provide a tight fit with the conduit 8.

After the assembly has been mounted on the conduit 8, a hole 20 is drilled. A drilling tool can be installed on the upper flange of the reel 9, and after drilling, the tool is removed. The remaining mounting elements are installed on the upper flange of the reel 9.

The fasteners 17 joining the seat 10 and the reel 9 are loosened so that a correct distance between the flanges remains thanks to an appropriate distance means. The two screws 17', 17" impeding the insertion of sluice 15 are removed, so that sluice 15 can be inserted. Tab 19 includes a hole 18 which serves as a bearing permitting rotation of sluice 15 around an axle.

After the assembly has been installed with sluice 15 in a closed position, the sluice 15 can be removed, the two fasteners 17', 17", previously removed, can be repositioned, and all the fasteners 17 of the flanges can be tightened, completing the connection.

We claim:

1. A device for cutting off the flow of a fluid in a conduit which includes two portions, each of said portions having a flanged end, means for fastening the flanged ends together, at least one flanged end being provided with a circular sealing gasket and including a tab extending radially beyond at least one flanged end, said tab including a hole serving as a bearing; and
    a sluice having a valving portion movable between the flanged ends, said sluice including a radially extending external pivot arm portion including an axle inserted into said hole, through said radially extending tab to act as a bearing to permit rotary motion of the sluice relative to said flanged end so that fluid flow is cut off in a first sluice position by said valving portion when it extends across said conduit between said flanged ends and fluid can flow through the conduit in a second sluice position when said valving portion is moved externally of said flanged portion.

2. For use on a conduit which may be under pressure of a fluid, an assembly which permits mounting of an additional conduit, said assembly comprising:
    a tubular body having a flanged bottom and configured for mounting on a conduit; said tubular body having a top formed as a flange, a first and a second tabs arranged on opposite sides of the flange, each tab having an opening near the tab ends and at least one tab having a central hole serving as a bearing;
    a first gasket providing a seal between the conduit and the tubular seat bottom;
    a second gasket inserted into a circular groove of the flange;
    a pair of fastening means for pressing said tabs and thus said tubular body against the conduit;
    a reel having flanges on its bottom and top ends;
    a sluice having a valving portion movable between the flanged ends of said tubular body top portion and said reel bottom portion, said sluice including a radially extending external pivot arm portion including an axle inserted into said hole, through said radially extending tab to act as a bearing to permit rotary motion of the sluice relative to said flanged ends so that fluid flow is cut off in a first sluice position by said valving portion when it extends across said conduit between said flanged ends and fluid can flow through the conduit in a second sluice position when said valving portion is moved externally of said flanged ends; and
    a plurality of bolts and nuts for pressing the tubular seat flange and the reel bottom flange together.

3. The assembly according to claim 2, wherein said fastening means comprises a strap with tapped ends, screws resting on ball-and-sockets within openings in said brackets, the screws cooperating with the tapped ends for providing correct orientation of the tubular seat on the conduit.

* * * * *